United States Patent
Joao

(10) Patent No.: US 10,913,412 B2
(45) Date of Patent: *Feb. 9, 2021

(54) BATTERY POWER MANAGEMENT APPARATUS AND METHOD

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,023

(22) Filed: Oct. 28, 2019

(65) Prior Publication Data

US 2020/0055474 A1 Feb. 20, 2020

Related U.S. Application Data

(63) Continuation of application No. 16/236,367, filed on Dec. 29, 2018, now Pat. No. 10,493,931, which is a continuation of application No. 15/719,889, filed on Sep. 29, 2017, now Pat. No. 10,207,663, which is a continuation of application No. 14/705,996, filed on May 7, 2015, now Pat. No. 9,821,738.

(60) Provisional application No. 62/025,445, filed on Jul. 16, 2014, provisional application No. 62/018,687, filed on Jun. 30, 2014.

(51) Int. Cl.
*B60R 22/00* (2006.01)
*F02P 9/00* (2006.01)
*B60R 16/033* (2006.01)
*H02J 7/14* (2006.01)

(52) U.S. Cl.
CPC .......... *B60R 16/033* (2013.01); *H02J 7/1423* (2013.01); *Y02T 10/70* (2013.01)

(58) Field of Classification Search
None
See application file for complete search history.

(56) References Cited

U.S. PATENT DOCUMENTS 10,493,931 B2 * 12/2019 Joao ...................... H02J 7/1423

* cited by examiner

*Primary Examiner* — Kenneth B Wells
(74) *Attorney, Agent, or Firm* — Raymond A. Joao, Esq.

(57) ABSTRACT

An apparatus, including a first circuit which contains a first load of a premises or article, which first load does not draw current from a first battery when a system of the premises or article is not operating; a second circuit which contains a second load of the premises or article, which second load draws current from a second battery when the system is not operating or is non-operational; a first switch which is capable of disconnecting the first battery from the first circuit; a second switch which is capable of connecting the first battery to the first circuit; and at least one recharger which is capable of recharging the first battery and the second battery when the system is operating. The apparatus is capable of providing electrical power to the second load when the at least one recharger ceases to operate or becomes non-operational.

20 Claims, 8 Drawing Sheets

BATTERY POWER MANAGEMENT APPARATUS AND METHOD

RELATED APPLICATIONS

This is a continuation application of U.S. patent application Ser. No. 16/236,367, filed Dec. 29, 2018, and entitled "BATTERY POWER MANAGEMENT APPARATUS AND METHOD", now U.S. Pat. No. 10,493,367, the subject matter and teachings of which are hereby incorporated by reference herein in their entirety, which application is a continuation application of U.S. patent application Ser. No. 15/719,889, filed Sep. 29, 2017, and entitled "BATTERY POWER MANAGEMENT APPARATUS AND METHOD", now U.S. Pat. No. 10,207,663, the subject matter and teachings of which are hereby incorporated by reference herein in their entirety, which application is a continuation application of U.S. patent application Ser. No. 14/705,996, filed May 7, 2015, and entitled "BATTERY POWER MANAGEMENT APPARATUS AND METHOD", now U.S. Pat. No. 9,821,738, the subject matter and teachings of which are hereby incorporated by reference herein in their entirety. U.S. patent application Ser. No. 14/705,996, filed May 7, 2015, claims the benefit of the priority of U.S. Provisional Patent Application Ser. No. 62/025,445, filed Jul. 16, 2014, and entitled "BATTERY POWER MANAGEMENT APPARATUS AND METHOD", the subject matter and teachings of which are hereby incorporated by reference herein in their entirety. U.S. patent application Ser. No. 14/705,996, filed May 7, 2015, also claims the benefit of the priority of U.S. Provisional Patent Application Ser. No. 62/018,687, filed Jun. 30, 2014, and entitled "BATTERY POWER MANAGEMENT APPARATUS AND METHOD", the subject matter and teachings of which are hereby incorporated by reference herein in their entirety.

FIELD OF THE INVENTION

The present invention pertains to a battery power management apparatus and method and, in particular, to a battery power management apparatus and method which can conserve battery power and/or battery charge level for electrical systems and/or components which do not require power when a vehicle, a premises, or an article, is not operating or not in use, while providing power to and/or for electrical systems and/or components which require power when the vehicle, the premises, or the article, is not operating or not in use, or which otherwise need to be provided with power when a power source and/or a battery recharging source ceases to operate or is not operational.

BACKGROUND OF THE INVENTION

Batteries and direct current (DC) power sources are utilized in many applications. Perhaps one of the most common uses of batteries and DC power sources is in automobiles. Typically, a vehicle battery provides the power which powers the vehicle's ignition system and a vehicle alternator generates electrical power when the vehicle's engine is operating which power can be utilized to provide the electrical power for many of a wide variety of vehicle systems, equipment systems, and/or components, along with electrical power to charge the vehicle battery.

As many who own a vehicle will readily understand, there are a number of vehicle systems, equipment systems, or components, such as, but not limited to, anti-theft systems, RF systems which operate in connection with remote control door lock openers, electronic command computers, radio clocks, and any other systems, equipment systems, or components, which require power when the vehicle is not operating, not in use, or when the engine is not operating or is not running. These vehicle systems, equipment systems, or components, which require power when the vehicle is not operating, not in use, or when the engine is not operating or is not running, presents which some may call drain or a "parasitic drain" on the vehicle battery. This drain or "parasitic drain" on the vehicle battery can deplete the vehicle's battery of its charge to a point where the battery either goes dead or does not have sufficient power to start the vehicle and/or to ensure that all vehicle systems, equipment systems, or components, are fully powered.

Disconnecting a vehicle's battery when the vehicle is not in use can serve to reserve the battery charge and/or power level, but such disconnecting of the battery deprives those vehicle systems, equipment systems, or components, which require power when the vehicle is not operating, not in use, or when the engine is not operating or is not running, of power and thereby shutting the same down. The shutting down of a vehicle's command computer, anti-theft system, radio clock, or dashboard gauges, or any other systems, equipment systems, or components, is not desirable. While vehicles are designed and built to accommodate these drains and/or "parasitic drains" on the vehicle battery when the vehicle is not operating, not in use, or when the engine is not operating or is not running, sometimes these drains or "parasitic drains" can cause a battery to lose its charge or "go dead". Sometimes these drains are also caused by short circuits in a vehicle electric circuit, and the diagnosing and repair of same can be very time consuming and expensive.

Similar drains or "parasitic drains" can also be found in DC circuits utilized in any type or kind of vehicles, land vehicles, automobiles, trucks, recreational vehicles, boats, marine vessels, submarines, aircraft, airplanes, jets, helicopters, spacecraft, space shuttles, recreational vehicles, motorcycles, scooters, or any other type or kind of vehicle, any type or kind of premises, residential premises, commercial premises, equipment, of any system, equipment system, or component, of, in, or associated with, same, or any article which may utilize a DC power source.

Other problems can also arise when a vehicle power source or battery recharging device or source ceases to operate or is not operational, or is turned off, suddenly, unintentionally, or otherwise. For example, certain vehicles utilize alternators in order to provide power to certain of the vehicle's systems, equipment systems, devices, or components, and in order to recharge the vehicle battery, when the vehicle engine is running. The alternator might provide power to any number of vehicle systems, equipment systems, devices, or components, as well as recharge the vehicle battery when the engine is running, but the alternator stops doing so when the vehicle engine stops running or is turned off. When this occurs, those vehicle systems, equipment systems, devices, or components, which are powered by the alternator, lose power and become non-operational. These vehicle systems, equipment systems, devices, or components, can include the vehicle's power steering system, the vehicle's power brakes system, the vehicle's traction control system, the vehicle's electronic stability control system, the vehicle's anti-lock brake system, the vehicle's safety systems, the vehicle's lights, the vehicle's power door locks or vehicle power door lock systems, the vehicle's airbag systems, the vehicle's passenger restraint systems, the vehicle's supplemental restraint systems, the vehicle's communication systems, the vehicle's emergency communication systems, among others. Any loss of power to these vehicle systems, equipment systems, devices, or components can result in accidents which can cause serious injury or even death.

Similar loss of power problems can also be found in AC and/or DC circuits utilized in any type or kind of vehicles, land vehicles, automobiles, trucks, recreational vehicles, boats, marine vessels, submarines, aircraft, airplanes, jets, helicopters, spacecraft, space shuttles, recreational vehicles, motorcycles, scooters, or any other type or kind of vehicle, any type or kind of premises, residential premises, commercial premises, equipment, of any system, equipment system, or component, of, in, or associated with, same, or any article which may utilize a DC power source or battery in connection with a power source such as a generator or alternator which can provide power to certain systems, equipment systems, devices, or components, and/or which may also serve to recharge the DC power source or battery.

SUMMARY OF THE INVENTION

The present invention pertains to a battery power management apparatus and method and, in particular, to a battery power management apparatus and method which can conserve battery power and/or battery charge level for electrical systems and/or components which do not require power when a vehicle, a premises, or an article, is not operating or not in use, while providing power to and/or for electrical systems and/or components which require power when the vehicle, the premises, or the article, is not operating or not in use, or which otherwise needs to be provided with power when a power source and/or a recharging source ceases to operate, is non-operational, or is turned off, which overcomes the shortfalls of the prior art.

The apparatus and method of the present invention can be utilized in any number of a wide variety of applications, including but not limited to, applications in, or in connection with, motor vehicles, automobiles, trucks, mass transportation vehicles, buses, school buses, trains, subway trains, aircraft, airplanes, jets, gliders, hot air balloons, spacecraft, space shuttles, satellites, boats, marine vehicles, marine vessels, submarines, motorcycles, motor scooters, recreational vehicles (RVs) of any type or kind, mobile homes, jet skis, equipment of any kind or type, or any other vehicle (hereinafter referred to as a "vehicle" or "vehicles"), or in applications in, or in connection with, premises, residential premises, commercial premises, buildings, structures, land, or any land and/or structure of any type or kind (hereinafter referred to as a "premises" or "premises"), or in applications in, with, or in connection with, any article or device (hereinafter "article" or "articles") which utilizes a battery or a DC power source and which is also equipped for, adapted for, or capable of, recharging that battery or DC power source. The apparatus and method of the present invention can be utilized in connection with gasoline-powered vehicles, diesel-powered vehicles, or any other fuel-powered vehicles, combustion engine powered vehicles, electric-powered vehicles, hybrid-powered vehicles, or any other types or kinds of vehicles.

The apparatus of the present invention can be utilized in, on, or in connection with, or can be adapted for and utilized in, on, or in connection with, any of the herein-identified and/or herein-defined vehicles, premises, or articles.

The apparatus includes a primary vehicle battery which can be connected to or with, or which is connectable to and/or with, the vehicle ignition system as well as any other vehicle electrical system or device or vehicle electronic system or device of the vehicle and which does not draw electrical power or current when the vehicle or the vehicle ignition system is not in use (hereafter collectively referred to as "non-drain loads"). The primary vehicle battery can be any battery or DC power source which is suitable for use in, on, or in connection with, the particular vehicle.

The primary vehicle battery can be electrically connected with, or coupled to, the vehicle ignition system in any appropriate circuit configuration, such as, but not limited to, a parallel connection or a series connection, or any combination of same, and to any number of any of the other non-drain loads in, on, or of, the vehicle in any appropriate circuit configuration, such as, but not limited to, a parallel connection or a series connection. The vehicle non-drain loads can be any electrical circuit, system, equipment system, device, or component, which requires electrical power when the vehicle, or any electrical circuit, system, equipment system, device, or component, is in use or is being operated.

The apparatus also includes a main cutoff switch which can be connected in series with the primary vehicle battery. The main cutoff switch can serve to disconnect the primary vehicle battery from all vehicle circuits and/or devices including, but not limited to, the vehicle ignition system and the vehicle non-drain loads. In this regard, the cutoff switch can be utilized to completely and electrically disconnect the primary vehicle battery from any and all loads in, on, or connected with, the vehicle.

The main cutoff switch can be a manual switch which can be placed at any suitable or convenient location in or on the vehicle and/or the main cutoff switch can also be a remotely controlled switch, such as those typically utilized in connection with remote controlled vehicle starters or remote controlled vehicle ignition systems. In this regard, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by a receiver or any other appropriate controller, control device, computer, or other device, which can cause the main cutoff switch to close in order to remotely enable the vehicle to be utilized, or can cause the main cutoff switch to open so as to disable vehicle operation.

The apparatus can also include a vehicle ignition/On switch, which can be connected in series with the primary vehicle battery and which can be utilized to electrically connect or electrically disconnect the primary vehicle battery to or from each of to the vehicle ignition system and/or to or from each of any number of the non-drain loads. The vehicle ignition/On switch can also be utilized to selectively activate the vehicle ignition system in order to start the vehicle engine and/or to activate, and/or to enable an activation of, any one or more of any of the vehicles systems, equipment systems, devices, or components, and/or any vehicle non-drain loads, of the vehicle and/or to activate, and/or to enable the activation of, any one or more of the electrical circuits, systems, equipment systems, devices, or components, and/or any vehicle non-drain loads, of the vehicle which require electrical power for use or operation.

The vehicle ignition/On switch can be a manual switch, such as those which are typically utilized in connection with a vehicle key and/or the vehicle ignition/On switch can also be a remotely controlled switch, such as those typically utilized in connection with remote controlled vehicle starters or remote controlled vehicle ignition systems. In this regard, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by the receiver or any other appropriate controller, control device, computer, or other device, which can cause the vehicle ignition/On switch to close in order to remotely start the vehicle's engine or can, in and under appropriate and safe circumstances, such when the vehicle engine is off, cause the vehicle ignition/On switch to open so as to disable vehicle operation.

The apparatus also includes a vehicle auxiliary battery which can be the same as, or can be of the same type or kind of battery or DC power source as the primary vehicle battery. Both of the primary vehicle battery and the vehicle auxiliary battery can be 12 volt automobile batteries, in the case where the vehicle is an automobile, which can have similar, if not identical, specifications and which can be recharged from, by, with, or using, the same electrical vehicle alternator described herein. The vehicle auxiliary battery can be connected in series or in parallel with each of all of the vehicle devices, equipment, equipment systems, or components, which typically drain current from a vehicle battery when the vehicle of the vehicle ignition systems is not operation or "off" (hereinafter collectively referred to as the "drain loads").

The drain loads can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times. In this regard, the drain loads can include, but are not limited to, a vehicle anti-theft system, a vehicle radio memory storage system or device, a radio clock, any command computer or command computers, remote door opening systems, or devices, remote control systems or devices, or any other systems, equipment systems, devices, or components, which are known to dram electrical power at all times and which can drain a vehicle battery of current and deplete its charge or charge level when a vehicle is typically not in use or is not operating.

The apparatus can also be connected to or with the vehicle alternator, which alternator is typically equipped to, and also used in order to, perform a number of functions including, but not limited to, recharging the battery of a vehicle, and which can be utilized in the apparatus of the present invention in order to continuously re-charge each of the primary vehicle battery and the vehicle auxiliary battery of the apparatus of the present invention. A single vehicle alternator can be used to recharge both the primary vehicle battery and the vehicle auxiliary battery. Two alternators can also be utilized so that one alternator can be utilized to charge the primary vehicle battery and so that the other alternator can be utilized to charge the vehicle auxiliary battery. Any pertinent circuits, components, or devices, of the alternator can be connected between each respective electrical circuit or connector(s) associated with the recharging of each of the primary vehicle battery and the vehicle auxiliary battery and a ground as needed or desired. In a preferred embodiment, the apparatus can also be connected to the ground as needed or desired.

In an embodiment in which two alternators are employed, one of the alternators can be dedicated for performing all of the functions of a typical vehicle alternator as well as, and including, recharging the primary vehicle battery and providing electrical power to the vehicle ignition system, the vehicle non-drain loads, or any electrical circuit, system, equipment system, device, or component, of the vehicle which requires electrical power when the vehicle, or any electrical circuit, system, equipment system, device, or component, is in use or is being operated, while the second alternator can be dedicated for recharging the vehicle auxiliary battery and, if needed or desired, for performing any other functions such as providing electrical power to any of the drain loads of the vehicle. In an embodiment in which two alternators are utilized, the first alternator can be connected to vehicle ground and to each of the various vehicle electrical circuits needed for providing any needed electrical power to the various electrical circuits, systems, equipment systems, devices, or components, of, in, on, or associated with, the vehicle and for recharging the primary vehicle battery, while the second alternator can be connected to vehicle ground and to any vehicle electrical circuit(s) needed for recharging the vehicle auxiliary battery as well as to any other electrical circuit(s) for which the second alternator is being utilized to supply electrical power.

The apparatus can also be utilized in order to remotely open or to remotely close each of the main cutoff switch and the vehicle ignition/On switch. In such an embodiment, the apparatus can include a transmitter, which can be any type or kind of remote control transmitter for opening or closing the circuit controlled by the main cutoff switch and which can be integrated into and/or with a vehicle remote control device, a key chain, or a key fob, or any other device, a receiver located at, in, or on, the vehicle, for receiving a signal, signals, or sequence of signals, transmitted from the transmitter and indicative of a main shutoff switch opening operation or a main cutoff switch closing operation, a controller for processing any signal, signals, or sequence of signals, received by the receiver, and an electronically activated switching device which can located in parallel with the main cutoff switch, which can serve to close or open the circuit controlled by the main cutoff switch. The electronically activated switching device can be placed in parallel with the main cutoff switch so that it can simply bypass the main cutoff switch.

The apparatus can also include a transmitter, which can be any type or kind of remote control transmitter for opening or closing the circuit controlled by the vehicle ignition/On switch and which can also be integrated into and/or with a vehicle remote control device, a key chain, or a key fob, or any other device, a receiver located at, in, or on, the vehicle, for receiving a signal, signals, or sequence of signals, transmitted from the transmitter and indicative of a vehicle ignition switch opening operation or a vehicle ignition switch closing operation, a controller for processing any signal, signals, or sequence of signals, received by the receiver, and an electronically activated switching device which can located in parallel with the vehicle ignition/On switch, which can serve to close or open the circuit controlled by the vehicle ignition/On switch. The electronically activated switching device can be placed in parallel with the vehicle ignition/On switch so that it can simply bypass the vehicle ignition/On switch.

The above-described transmitters can also be implemented by, replaced by, or used in conjunction with, a central processing computer or an Internet server which can be associated with a web site. Any authorized user or authorized person can utilize any suitable communication device, which can be a personal computer, a tablet, a tablet computer, a laptop computer, a notebook computer, a cellular telephone, a wireless telephone, a personal digital assistant, or any other suitable device, in order transmit any respective signal, signals, or sequence of signals, to a respective receiver via the central processing computer on, over, or via, the Internet and/or the World Wide Web, and/or on or over any other communication network(s), wireless communication network(s), or any combination of same. In this regard, any authorized user or authorized person can use or control the apparatus of the present invention on, over, or via, the Internet and/or the World Wide Web and/or any other communication network(s), wireless communication network(s), or any combination of same.

The apparatus of the present invention can be utilized to provide and to perform battery power management in and for any of the herein-described vehicles, premises, or articles, by providing, and/or by allowing for, the electrical powering of any electrical devices, which typically require electrical power at all times and/or when the respective vehicle, premises, or article, is not in use, while, at the same time, conserving the power of the main battery of the vehicle, the premises, or article, which is needed to activate and operate the vehicle, the premises, or the article, when same is desired to be used and/or in use.

In an embodiment wherein the main cutoff switch and the vehicle ignition switch are both in the "switch open" state or position or in the "OFF" state or position, which can be indicative of the vehicle not being in use, the primary vehicle battery can be completely disconnected from the vehicle ignition system and from the vehicle non-drain loads, which vehicle non-drain loads can be any electrical circuit, system, equipment system, device, or component, which requires electrical power when the vehicle, or any electrical circuit, system, equipment system, device, or component, is in use or is being operated. When the primary vehicle battery is completely disconnected from the vehicle ignition system and the vehicle non-drain loads, the electrical power and/or the charge level of the primary vehicle battery is conserved for later use. The apparatus provides the advantage that no electrical power is drained from the primary vehicle battery 10 when the vehicle is not operating and/or not in use, thereby conserving the charge level and the electrical power of the primary vehicle battery for later use.

The apparatus can also function as a valuable vehicle anti-theft device for the vehicle as no electrical power can be provided to the vehicle ignition system when the main cutoff switch is in the "switch open" or "OFF" state or position. Even if one were to gain access to a vehicle key or otherwise attempt to bypass the vehicle ignition/On switch, the primary vehicle battery will remain disconnected from the vehicle ignition system and from the vehicle non-drain loads. In this manner, the apparatus of the present invention can also be utilized as a vehicle anti-theft system or device.

The vehicle auxiliary battery can provide electrical power to any and/or all of the drain loads which typically draw electrical power at all times and/or when the vehicle is in use, or operating, as well as when the vehicle is not in use or not operating. As noted above, the drain loads can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times.

In this regard, the apparatus of the present invention can provide electrical power to the drain loads from the vehicle auxiliary battery while conserving the charge level and electrical power capacity of the primary vehicle battery. As noted above, the apparatus can also serve an anti-theft function and/or a theft-deterrence function for the vehicle as the primary vehicle battery is, and remains, completely disconnected from the vehicle ignition system when the main cutoff switch is in the "switch open" state or position or in the "OFF" state or position.

When the main cutoff switch is in the "switch closed" position, the primary vehicle battery can be capable of providing electrical power to the vehicle ignition system and to any of the vehicle non-drain loads described herein, and/or to any of the vehicle's systems, equipment systems, components, or devices, which can be powered by the primary vehicle battery upon, and/or subject to, the closing of the vehicle ignition/On switch.

When both the main cutoff switch and the vehicle ignition/On switch are in the "switch closed" or "ON" position, an operator can start the vehicle's engine by closing the vehicle ignition/On switch. Once the vehicle engine is running, the primary vehicle battery can provide electrical power to or for the vehicle ignition system as well as to or for to any of the vehicle non-drain loads described herein, and/or to any of the vehicle's systems, equipment systems, components, or devices.

During vehicle engine operation, the alternator or alternators, if more than one alternator is utilized, and/or any respective component(s) of the alternator or alternators can be driven by the vehicle engine in order to generate electrical power which can include both an alternating current (AC) power and a direct current (DC) power. If a single alternator is utilized, then the alternator can re-charge both the primary vehicle battery and the vehicle auxiliary battery during vehicle engine operation and can provide electrical power to or for any of the vehicle non-drain loads or drain loads described herein, and/or to any of the vehicle's systems, equipment systems, components, or devices. If two alternators are utilized, then one alternator can be connected to, and can re-charge, the primary vehicle battery, as well as provide AC and/or DC power to any of the vehicle non-drain loads described herein, and/or to any of the vehicle's systems, equipment systems, components, or devices, while the other alternator can be connected to, and can re-charge, the vehicle auxiliary battery, as well as provide AC and/or DC power to any of the vehicle's drain loads. In this regard, both the primary vehicle battery and the vehicle auxiliary battery can be re-charged during vehicle engine operation.

Use of the apparatus of the present invention can be optimized if the main cutoff switch is opened, and, therefore, placed in the "switch open" state or position or in the "OFF" state or position, immediately after the vehicle engine is turned off and thereby returned to the "switch closed" state or position or the "ON" state or position just prior to attempting to start the vehicle engine or just prior to otherwise turning the vehicle, or any vehicle system, equipment system, component, or device, "ON", by closing the vehicle ignition/On switch, such as by switching the vehicle ignition/On switch to the "switch closed" state or position or to the "ON" state or position, or by otherwise simply turning and ignition key or pushing an ignition button or switch. In this regard, the primary vehicle battery can be "connected" when use of the vehicle, the vehicle engine, or any vehicle system, equipment system, component, or device powered by the primary vehicle battery, is desired, and the primary battery can be "disconnected" when use of the vehicle, the vehicle engine, or any vehicle system, equipment system, component, or device, which is powered by the primary vehicle battery, has ceased and/or is no longer desired. Substantial anti-theft advantages are also realized by the apparatus of the present invention as the vehicle engine will not be capable of being activated or started with the primary vehicle battery being disconnected from the vehicle ignition system.

The apparatus provides the vehicle auxiliary battery which can provide any and/or all of the vehicle drain loads with electrical power when the vehicle engine is off or not running, while preserving and/or conserving the battery charge level of the primary vehicle battery which can be completely disconnected from any electrical power or current drain loads, from the vehicle ignition system, and/or from any of the vehicle non-drain loads described herein, and/or from any of the vehicle's system, equipment systems, components, or devices. The apparatus provides a primary vehicle battery which can be completely disconnected from any load, from the vehicle ignition system, from any of the vehicle non-drain loads described herein, and/or to any of the vehicle's system, equipment systems, components, or devices, and/or from any of the vehicle drain loads, when the vehicle engine is not running, thereby maintaining a maximum charge level for the primary vehicle battery. Even if the charge level of the vehicle auxiliary battery should become depleted during a period of non-use of the vehicle engine, the primary vehicle battery can always have a sufficient charge level to start the vehicle engine and the respective vehicle alternator(s) can re-charge the vehicle auxiliary battery as well as can re-charge the primary vehicle battery.

In the manner described herein, the apparatus of the present invention provides a novel battery power management apparatus and method which can be utilized in order to provide an apparatus or system which can be utilized to ensure that a charge level of a primary vehicle battery can always be maintained, while allowing for sufficient electrical power to be provided to vehicle systems, equipment systems, components, or devices, which require and which continue to draw electrical power when the vehicle's engine is not running. In this regard, by using the apparatus of the present invention, one can ensure that any drain loads or short circuits will not cause a primary vehicle battery to be discharged or depleted of its charge and/or "go dead" while also ensuring that any and/or all vehicle systems, equipment systems, components, or devices, which require electrical power at all times and/or when the vehicle engine is not running, are provided with the electrical power needed to ensure their proper operation.

The can also include a voltage stabilizing load or resistor which can be utilized and which can be inserted between the circuit portion of the apparatus which is powered by the primary vehicle battery and the circuit portion of the apparatus which is powered by the vehicle auxiliary battery in order to connect the two circuit portions together. The resistor can be connected in between the positive sides of each of the primary vehicle battery and the vehicle auxiliary battery. With the use of the resistor, electrical power can be provided from the vehicle auxiliary battery to the vehicle ignition system and to the vehicle non-drain loads, if desired, when the vehicle ignition/On switch is in the "switch closed" state or position or in the "ON" state or position, whether or not the main cutoff switch is in the "switch closed" or "ON" state or position or in the "switch open" or "OFF" state or position. When the main cutoff switch is in the "switch closed" state or position or in the "ON" state or position, electrical power can also be provided from the primary vehicle battery to the vehicle drain loads, if desired. The resistor serves to connect the two circuit portions together while providing a stabilizing voltage drop across same in the event that the respective voltages of the primary vehicle battery and the vehicle auxiliary battery are not equal.

The apparatus and method of the present invention can also be utilized in order to provide power to any vehicle systems, equipment systems, devices, or components, in the event that the vehicle engine stops running, for any reason, which can result in the loss of the power being provided to any vehicle systems, vehicle equipment systems, devices, or components, which require power for the safe operation of the vehicle and/or for operator and/or occupant safety.

The vehicle auxiliary battery can be utilized to provide electrical power to vehicle drain/non-drain loads which can include any and/or all of the vehicle drain loads as well as any loads which can be, or which can include, any of the vehicle systems, equipment systems, devices, or components, such as, but not limited to, the vehicle's power steering system, the vehicle's power brakes system, the vehicle's traction control system, the vehicle's electronic stability control system, the vehicle's anti-lock brake system, the vehicle's safety systems, the vehicle's lights, the vehicle's power door locks or vehicle power door lock systems, the vehicle's airbag systems, the vehicle's passenger restraint systems, the vehicle's supplemental restraint systems, the vehicle's communication systems, and/or the vehicle's emergency communication systems, and/or any other load, or vehicle system, equipment system, device, or component.

Any of the vehicle drain/non-drain loads can be designed to operate on DC power in the event that the vehicle engine stops running, for any reason.

The apparatus can be designed so that the vehicle auxiliary battery can provide electrical power to any and/or all of the vehicle drain/non-drain loads which are connected to same in the event the vehicle engine stops running for any reason. In this regard, the vehicle auxiliary battery can provide power to any of the vehicle systems, equipment systems, devices, or components, in the event that the vehicle engine stops running for any reason.

The primary vehicle battery can also be utilized in order to provide electrical power to the vehicle ignition system and to any number of, or any of, the vehicle non-drain loads. The primary vehicle battery can also be utilized so as to provide electrical power only to the vehicle ignition system.

The apparatus can also be utilized in such a way so that the primary vehicle battery can provide power to the vehicle non-drain loads without providing power to the vehicle ignition system. In this manner, with the vehicle ignition/On switch in the "switch open" state or position or in the "OFF" state or position, and with the main cutoff switch in the "switch closed" state or position or the "ON" state or position, the primary vehicle battery can provide power to the vehicle non-drain loads without providing power to the vehicle ignition system.

The apparatus of the present invention can be utilized in a same, a similar, and/or an analogous, manner, as described herein, in and/or with any application involving any type or kind or vehicles, premises, or articles, which utilize rechargeable batteries to provide electrical power to any type or kind of system, equipment system, component, or device, of the respective vehicle, premises, or article, while also providing electrical power to systems, equipment systems, components, or devices, of the respective vehicle, premises, or article, which require electrical power at all times.

DESCRIPTION OF THE PREFERRED EMBODIMENTS

Figure 1:
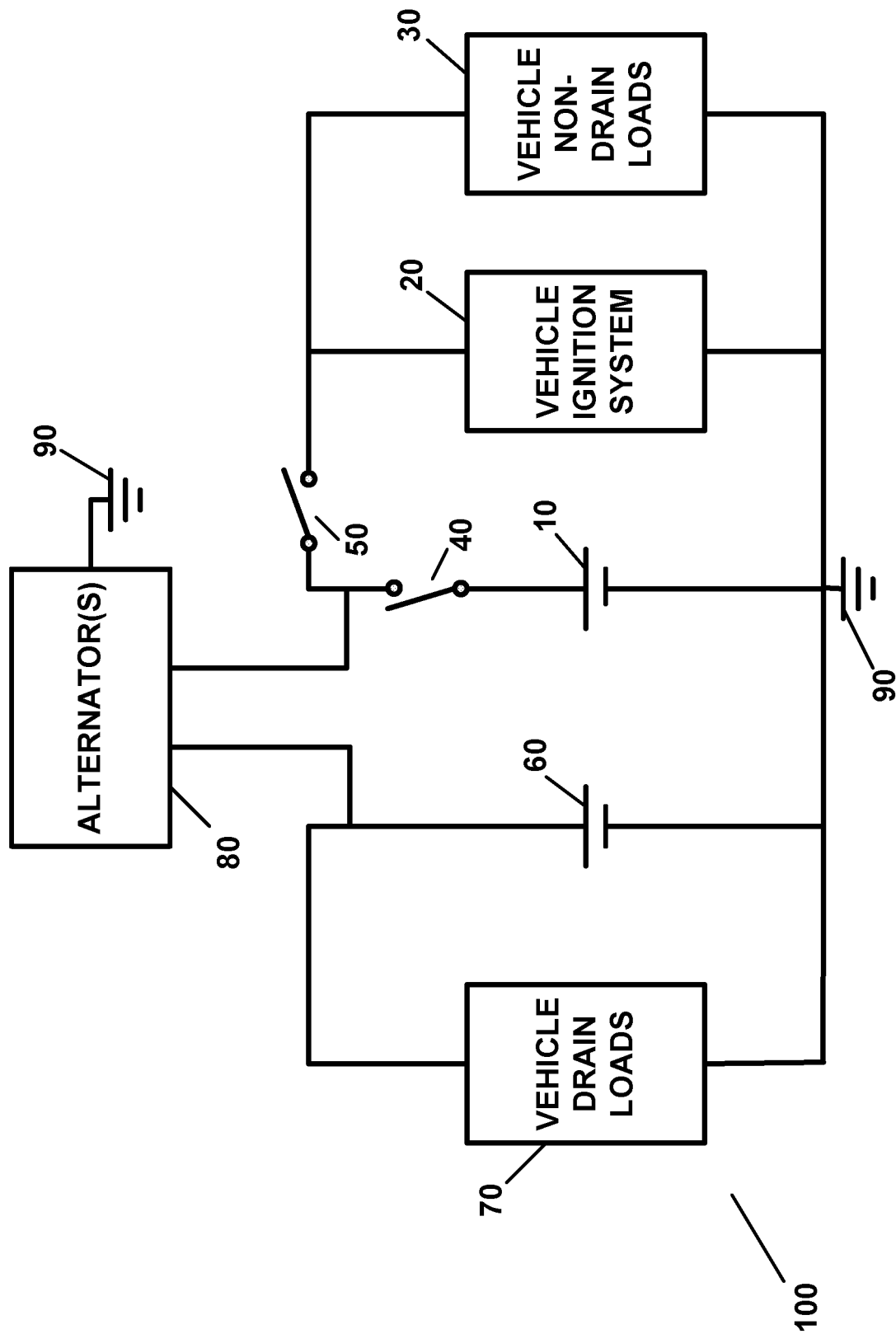
FIG. 1 illustrates a schematic diagram of a preferred embodiment of the apparatus of the present invention.

The present invention pertains to a battery power management apparatus and method and, in particular, to a battery power management apparatus and method which can conserve battery power and/or battery charge level for electrical systems and/or components which do not require power when a vehicle, a premises, or an article, is not operating or not in use, while providing power to and/or for electrical systems and/or components which require power when the vehicle, the premises, or the article, is not operating or not in use, or which otherwise needs to be provided with power when a power source and/or a recharging source ceases to operate, is non-operational, or is turned off.

The apparatus and method of the present invention can be utilized in any number of a wide variety of applications, including but not limited to, applications in, or in connection with, motor vehicles, automobiles, trucks, mass transportation vehicles, buses, school buses, trains, subway trains, aircraft, airplanes, jets, gliders, hot air balloons, spacecraft, space shuttles, satellites, boats, marine vehicles, marine vessels, submarines, motorcycles, motor scooters, recreational vehicles (RVs) of any type or kind, mobile homes, jet skis, equipment of any kind or type, or any other vehicle (hereinafter referred to as a "vehicle" or "vehicles"), or in applications in, or in connection with, premises, residential premises, commercial premises, buildings, structures, land, or any land and/or structure of any type or kind (hereinafter referred to as a "premises" or "premises"), or in applications in, with, or in connection with, any article or device (hereinafter "article" or "articles") which utilizes a battery or a DC power source and which is also equipped for, adapted for, or capable of, recharging that battery or DC power source. The apparatus and method of the present invention can be utilized in connection with gasoline-powered vehicles, diesel-powered vehicles, or any other fuel-powered vehicles, combustion engine powered vehicles, electric-powered vehicles, hybrid-powered vehicles, or any other types or kinds of vehicles.

The apparatus and method of the present invention can also provide a apparatus and method for remotely controlling, monitoring, and/or securing the battery power management apparatus of the present invention.

Applicant hereby incorporates by reference herein the subject matter and teachings of U.S. patent application Ser. No. 14/705,996, filed May 7, 2015, and entitled "BATTERY POWER MANAGEMENT APPARATUS AND METHOD", the subject matter and teachings of which are hereby incorporated by reference herein in their entirety.

Applicant hereby incorporates by reference herein the subject matter and teachings of U.S. Provisional Patent Application Ser. No. 62/025,445, filed Jul. 16, 2014, and entitled "BATTERY POWER MANAGEMENT APPARATUS AND METHOD", the subject matter and teachings of which are hereby incorporated by reference herein in their entirety. Applicant also hereby incorporates by reference herein the subject matter and teachings of U.S. Provisional Patent Application Ser. No. 62/018,687, filed Jun. 30, 2014, and entitled "BATTERY POWER MANAGEMENT APPARATUS AND METHOD", the subject matter and teachings of which are hereby incorporated by reference herein in their entirety.

FIG. 1 illustrates a schematic diagram of a preferred embodiment of the apparatus of the present invention which is designated generally by the reference numeral 100. In a preferred embodiment, the apparatus 100 is illustrated and described as being utilized in, on, or in connection with, a motor vehicle such as, but not limited to, a car, an automobile, or a truck. Although the apparatus 100 of FIG. 1 is illustrated and described as being utilized in, on, or in connection with, a motor vehicle, it is to be understood that the apparatus 100 of the present invention can also be utilized in, on, or in connection with, or can be adapted for and utilized in, on, or in connection with, any of the herein-identified and/or herein-defined vehicles, premises, or articles.

With reference to FIG. 1, the apparatus 100, in a preferred embodiment, includes a primary vehicle battery 10 which can be connected to or with, or which is connectable to and/or with, the vehicle ignition system as well as any other vehicle electrical system or device or vehicle electronic system or device of the vehicle and which does not draw electrical power or current when the vehicle or the vehicle ignition system is not in use (hereafter collectively referred to as "non-drain loads 30"). In a preferred embodiment, the primary vehicle battery 10 can be any battery or DC power source which is suitable for use in, on, or in connection with, the particular vehicle. For example, if the vehicle is an automobile, the primary vehicle battery 10 can be any 12 Volt battery typically utilized as an automobile battery.

With reference once again to FIG. 1, the primary vehicle battery 10 can be electrically connected with, or coupled to, the vehicle ignition system 20 in any appropriate circuit configuration, such as, but not limited to, a parallel connection or a series connection, or any combination of same, and to any number of any of the other non-drain loads in, on, or of, the vehicle, which are collectively designated by the reference numeral 30 in any appropriate circuit configuration, such as, but not limited to, a parallel connection or a series connection. The vehicle non-drain loads 30 can be any electrical circuit, system, equipment system, device, or component, which requires electrical power when the vehicle, or any electrical circuit, system, equipment system, device, or component, is in use or is being operated.

In a preferred embodiment, the apparatus 100 and the circuitry of the vehicle can be designed and implemented so that the vehicle ignition system 20 and all of the vehicle non-drain loads 30, and any associated or corresponding vehicle systems, equipment systems, components, and devices, are to be provided with electrical power from the primary vehicle battery 10.

With reference once again to FIG. 1, the apparatus 100 also includes a main cutoff switch 40 which is connected in series with the primary vehicle battery, as shown. In a preferred embodiment, the main cutoff switch 40 serves to disconnect the primary vehicle battery 10 from all vehicle circuits and/or devices including, but not limited to, the vehicle ignition system 20 and the vehicle non-drain loads 30. In this regard, the cutoff switch 40 can be utilized to completely and electrically disconnect the primary vehicle battery 10 from any and all loads in, on, or connected with, the vehicle.

In a preferred embodiment, the main cutoff switch 40 can be a manual switch which can be placed at any suitable or convenient location in or on the vehicle and/or the main cutoff switch 40 can also be a remotely controlled switch, such as those typically utilized in connection with remote controlled vehicle starters or remote controlled vehicle ignition systems. In this regard, in a preferred embodiment, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by a receiver or any other appropriate controller, control device, computer, or other device, which can cause the main cutoff switch 40 to close in order to remotely enable the vehicle to be utilized, or the can cause the main cutoff switch to open so as to disable vehicle operation. In FIG. 1, the main cutoff switch 40 is shown in the "switch open" or "OFF" state or position.

With reference once again to FIG. 1, the apparatus 100 also includes a vehicle ignition/On switch 50, which is connected in series with the primary vehicle battery 10, as shown, and which can be utilized to electrically connect or electrically disconnect the primary vehicle battery 10 to or from each of to the vehicle ignition system 20 and/or to or from each of any number of the non-drain loads 30. The vehicle ignition/On switch 50 can also be utilized to selectively activate the vehicle ignition system 20 in order to start the vehicle engine and/or to activate, and/or to enable an activation of, any one or more of any of the vehicles systems, equipment systems, devices, or components, and/or any vehicle non-drain loads 30, of the vehicle and/or to activate, and/or to enable the activation of, any one or more of the electrical circuits, systems, equipment systems, devices, or components, and/or any vehicle non-drain loads 30, of the vehicle which require electrical power for use or operation.

In a preferred embodiment, the vehicle ignition/On switch 50 can be a manual switch, such as those which are typically utilized in connection with a vehicle key and/or the vehicle ignition/On switch 50 can also be a remotely controlled switch, such as those typically utilized in connection with remote controlled vehicle starters or remote controlled vehicle ignition systems. In this regard in a preferred embodiment, a remote control device can be utilized to transmit, via a transmitter, a radio frequency (RF) signal, an infrared (IR) signal, or any other suitable signal, or communication transmission, which can be received by a corresponding receiver in, on, or at the vehicle, which can be processed by the receiver or any other appropriate controller, control device, computer, or other device, which can cause the vehicle ignition/On switch 50 to close in order to remotely start the vehicle's engine or can, in and under appropriate and safe circumstances, such when the vehicle engine is off, cause the vehicle ignition/On switch 50 to open so as to disable vehicle operation or vehicle engine operation. In FIG. 1, the vehicle ignition/On switch 50 is shown in the "switch open" or "OFF" state or position.

With reference once again to FIG. 1, the apparatus 100, in a preferred embodiment, also includes, a vehicle auxiliary battery 60, as shown. In a preferred embodiment, the vehicle auxiliary battery 60 can be the same as, or can be of the same type or kind of battery or DC power source as the primary vehicle battery 10. In a preferred embodiment, both of the primary vehicle battery 10 and the vehicle auxiliary battery 60 can be 12 volt automobile batteries, in the case where the vehicle is an automobile, which can have similar, if not identical, specifications and which can be recharged from, by, with, or using, the same electrical vehicle alternator described herein. The vehicle auxiliary battery 60 is connected in series or in parallel with each of all of the vehicle devices, equipment, equipment systems, or components, which typically drain current from a vehicle battery when the vehicle or the vehicle ignition system is not in operation or "off" (hereinafter collectively referred to as the "drain loads 70").

In a preferred embodiment, the drain loads 70 can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times. In this regard, the drain loads 70 can include, but are not limited to, a vehicle anti-theft system, a vehicle radio memory storage system or device, a radio clock, any command computer or command computers, remote door opening systems, or devices, remote control systems or devices, or any other systems, equipment systems, devices, or components, which are known to drain electrical power at all times and which can drain a vehicle battery of current and deplete its charge or charge level when a vehicle is typically not in use or is not operating.

In a preferred embodiment, the apparatus 100 and the circuitry of the vehicle can be designed and implemented so that the vehicle drain loads 70 and any associated or corresponding vehicle systems, equipment systems, components, and devices, are to be provided with electrical power from the vehicle auxiliary battery 60.

With reference once again to FIG. 1, the apparatus 100 can also be connected to or with the vehicle alternator 80, which alternator is typically equipped to, and also used in order to, perform a number of functions including, but not limited to, recharging the battery of a vehicle, and which can be utilized in the apparatus 100 of the present invention in order to continuously re-charge each of the primary vehicle battery 10 and the vehicle auxiliary battery 60 of the apparatus 100 of the present invention. In a preferred embodiment, a single vehicle alternator 80 can be used to recharge both the primary vehicle battery 10 and the vehicle auxiliary battery 60. In another preferred embodiment, two alternators can also be utilized so that one alternator 80 can be utilized to charge the primary vehicle battery 10 and so that the other alternator 80 can be utilized to charge the vehicle auxiliary battery 60. In a preferred embodiment, any pertinent circuits, components, or devices, of the alternator 80 can be connected between each respective electrical circuit or connector(s) associated with the recharging of each of the primary vehicle battery 10 and the vehicle auxiliary battery 60 and a vehicle ground 90 as needed or desired. In a preferred embodiment, the apparatus 100 can also be connected to the vehicle ground 90 as needed or desired.

In a preferred embodiment in which two alternators 80 are employed, one of the alternators can be dedicated for performing all of the functions of a typical vehicle alternator as well as, and including, recharging the primary vehicle battery 10 and providing electrical power to the vehicle ignition system 20, the vehicle non-drain loads 30, or any electrical circuit, system, equipment system, device, or component, of the vehicle which requires electrical power when the vehicle, or any electrical circuit, system, equipment system, device, or component, is in use or is being operated, while the second alternator can be dedicated for recharging the vehicle auxiliary battery 60 and, if needed or desired, for performing any other functions such as providing electrical power to any of the drain loads 70 of the vehicle. In an embodiment in which two alternators 80 are utilized, the first alternator 80 can be connected to vehicle ground 90 and to each of the various vehicle electrical circuits needed for providing any needed electrical power to the various electrical circuits, systems, equipment systems, devices, or components, of, in, on, or associated with, the vehicle and for recharging the primary vehicle battery 10, while the second alternator 80 can be connected to vehicle ground 90 and to any vehicle electrical circuit(s) needed for recharging the vehicle auxiliary battery 60 as well as to any other electrical circuit(s) for which the second alternator 80 is being utilized to supply electrical power.

Figure 2:
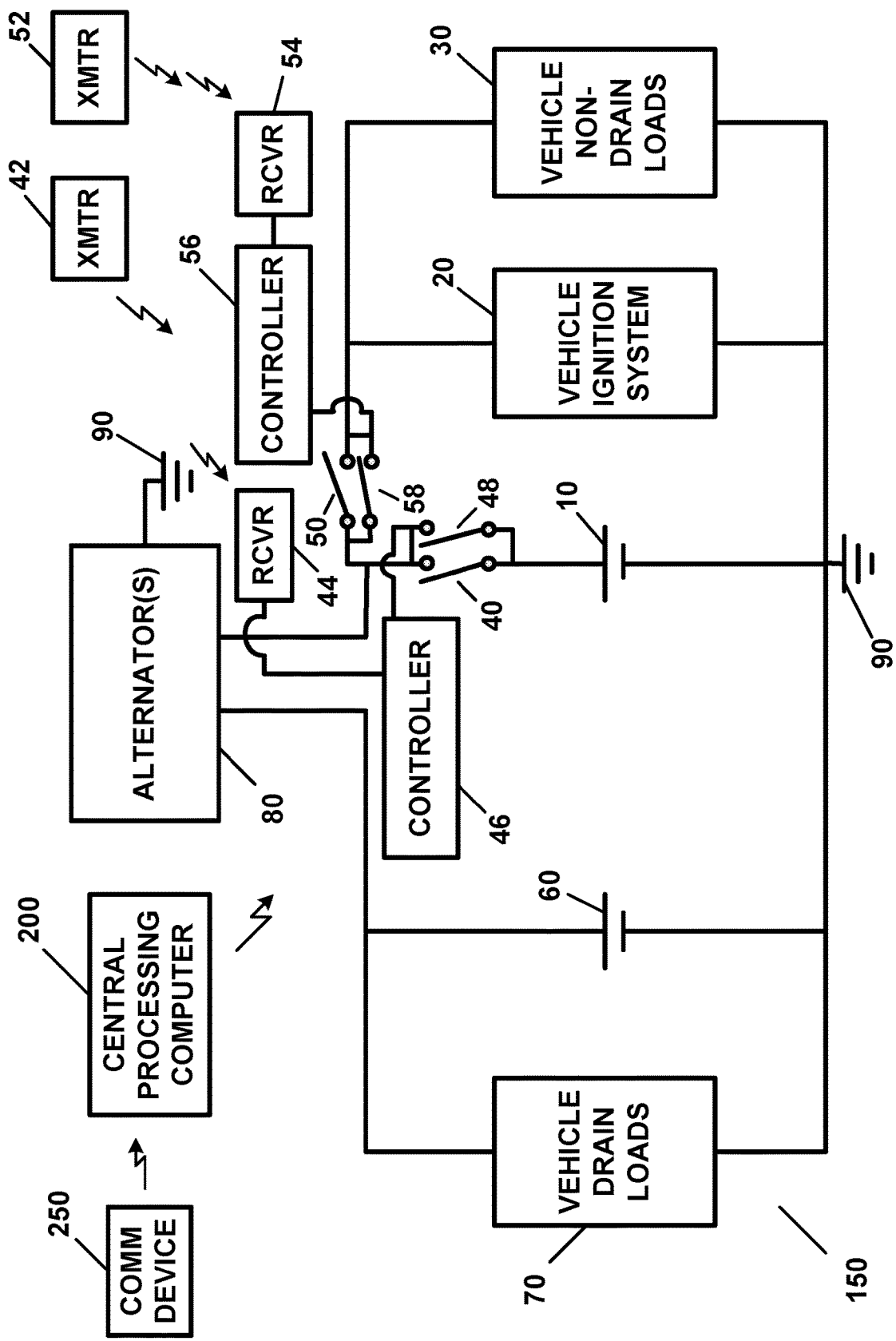
FIG. 2 illustrates another preferred embodiment of the apparatus of FIG. 1.

FIG. 2 illustrates another preferred embodiment of the apparatus 100 of FIG. 1. With reference to FIG. 2, the apparatus 100 includes all of the components of the apparatus 100 of FIG. 1 along with the addition of remote control circuitry and/or remote control components which can be utilized in order to remotely open or to remotely close each of the main cutoff switch 40 and the vehicle ignition/On switch 50.

With reference to FIG. 2, the apparatus 100 can include a transmitter 42, which can be any type or kind of remote control transmitter for opening or closing the circuit controlled by the main cutoff switch 40 and which, in a preferred embodiment, can be integrated into and/or with a vehicle remote control device, a key chain, or a key fob, or any other device, a receiver 44 located at, in, or on, the vehicle, for receiving a signal, signals, or sequence of signals, transmitted from the transmitter 42 and indicative of a main shutoff switch opening operation or a main cutoff switch closing operation, a controller 46 for processing any signal, signals, or sequence of signals, received by the receiver 44, and an electronically activated switching device 48 which can located in parallel with the main cutoff switch 40, which can serve to close or open the circuit controlled by the main cutoff switch 40. In a preferred embodiment, the electronically activated switching device 48 can be placed in parallel with the main cutoff switch 40 so that it can simply bypass the main cutoff switch 40 in a preferred embodiment.

With reference once again to FIG. 2, the apparatus 100 can include a transmitter 52, which can be any type or kind of remote control transmitter for opening or closing the circuit controlled by the vehicle ignition/On switch 50 and which, in a preferred embodiment, can also be integrated into and/or with a vehicle remote control device, a key chain, or a key fob, or any other device, a receiver 54 located at, in, or on, the vehicle, for receiving a signal, signals, or sequence of signals, transmitted from the transmitter 52 and indicative or a vehicle ignition switch opening operation or a vehicle ignition switch closing operation, a controller 56 for processing any signal, signals, or sequence of signals, received by the receiver 54, and an electronically activated switching device 58 which can located in parallel with the vehicle ignition/On switch 50, which can serve to close or open the circuit controlled by the vehicle ignition/On switch 50. In a preferred embodiment, the electronically activated switching device 58 can be placed in parallel with the vehicle ignition/On switch 50 so that it can simply bypass the vehicle ignition/On switch 50 in a preferred embodiment.

In a preferred embodiment, the transmitter 42 and/or the transmitter 52 can also be implemented by, replaced by, or used in conjunction with, a central processing computer or an Internet server 200 (hereinafter "central processing computer 200"), which can be associated with a web site. In another preferred embodiment, any authorized user or authorized person can utilize any suitable communication device 250, which, in a preferred embodiment, can be a personal computer, a tablet, a tablet computer, a laptop computer, a notebook computer, a cellular telephone, a wireless telephone, a personal digital assistant, or any other suitable device, in order transmit any respective signal, signals, or sequence of signals, to the respective receiver 44 and/or to the respective receiver 54 via the central processing computer 200 on, over, or via, the Internet and/or the World Wide Web, and/or on or over any other communication network(s), wireless communication network(s), or any combination of same. In this regard, in a preferred embodiment, any authorized user or authorized person can use or control the apparatus 100 of the present invention on, over, or via, the Internet and/or the World Wide Web and/or any other communication network(s), wireless communication network(s), or any combination of same.

The apparatus 100 of the present invention can be utilized in order to provide and to perform battery power management in and for any of the herein-described vehicles, premises, or articles, by providing, and/or by allowing for, the electrical powering of any electrical devices which typically require electrical power at all times and/or when the respective vehicle, premises, or article, is not operating and/or not in use, while, at the same time, conserving the power of the main battery of the vehicle, the premises, or the article, which is needed to activate and operate the vehicle, the premises, or the article, when same is desired to be used and/or in use. In a preferred embodiment, the use and operation of the apparatus 100 of the present invention can be described and illustrated in connection with use in a vehicle, such as an automobile. Although described and illustrated as being used and operated in connection with an automobile, it is important to note that the apparatus 100 can be utilized in, with, or in conjunction with, any vehicle, premises, or article.

Figure 3:
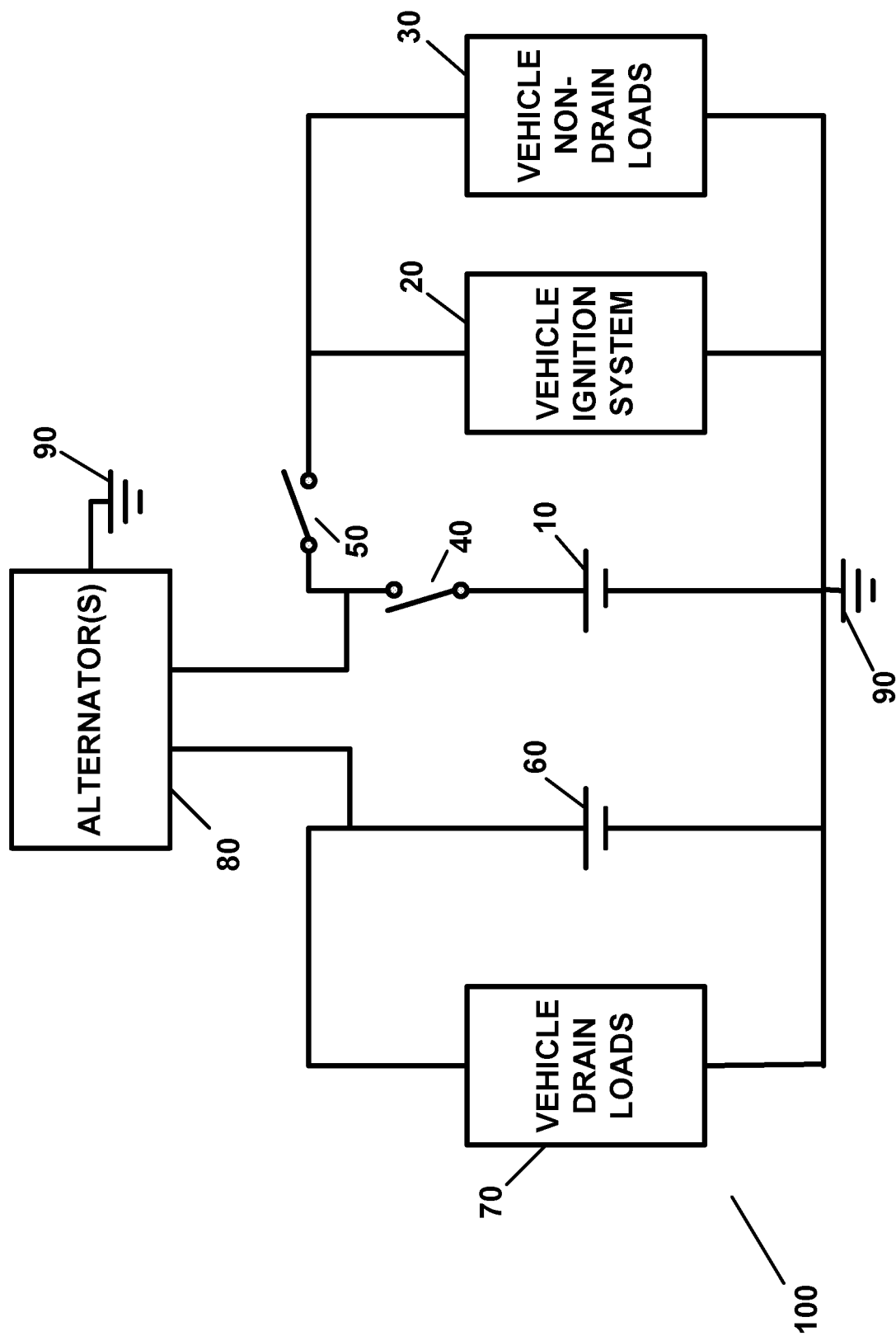
FIG. 3 illustrates the apparatus of FIG. 1 showing the main cutoff switch and the vehicle ignition switch both in the "switch open" state or position or in the "OFF" state or position.

FIG. 3 illustrates the apparatus 100 of FIG. 1 showing the main cutoff switch 40 and the vehicle ignition switch 50 both in the "switch open" state or position or in the "OFF" state or position. In the embodiment of FIG. 3, which is indicative of the vehicle not being in use, the primary vehicle battery is completely disconnected from the vehicle ignition system 20 and the vehicle non-drain loads 30, which vehicle non-drain loads 30 can be any electrical circuit, system, equipment system, device, or component, which requires electrical power when the vehicle, or any electrical circuit, system, equipment system, device, or component, is in use or is being operated. When the primary vehicle battery 10 is completely disconnected from the vehicle ignition system 20 and the vehicle non-drain loads 30, as shown in FIG. 3, the electrical power and/or the charge level of the primary vehicle battery 10 is conserved for later use. The apparatus 100, when utilized as shown in FIG. 3, provides the advantage that no electrical power is drained from the primary vehicle battery 10 when the vehicle is not operating or not in use, thereby conserving the charge level and the electrical power of the primary vehicle battery 10 for later use.

The apparatus 100, when utilized as shown in FIG. 3, can also function as a vehicle anti-theft device for the vehicle as no electrical power can be provided to the vehicle ignition system 20 when the main cutoff switch is in the "switch open" or "OFF" state or position. Even if one were to gain access to a vehicle key or otherwise attempt to bypass the vehicle ignition/On switch 50, the primary vehicle battery 10 will remain disconnected from the vehicle ignition system 20 and from the vehicle non-drain loads 30 when the main cutoff switch is in the "switch open" or "OFF" state or position. In this manner, the apparatus 100 of the present invention can also be utilized as a vehicle anti-theft system or device.

With reference once again to FIG. 3, the vehicle auxiliary battery 60 provides electrical power to any and/or all of the drain loads 70 which typically draw electrical power at all times and/or when the vehicle is in use, or operating, as well as when the vehicle is not in use or not operating. As noted above, the drain loads 70 can include, for example, but are not limited to, the vehicle command computer or command computers, any computers or devices which require to be electrically powered at all times, the vehicle anti-theft system or vehicle theft-deterrent system which require to be electrically powered at all times, the remote power door locking/unlocking system and any receivers and/or computers or processing devices associated with same which require electrical power at all times, the vehicle remote starter system and any receivers and/or computers or processing devices associated with same which require electrical power at all times, the vehicle radio clock, the vehicle radio memory system, any computers or devices having or utilizing memory or any other processing capabilities which require power at all times, any gauges or associated coils which require at least some electrical power at all times to remain properly functional, and any other vehicle systems, equipment systems, components, or devices, which require electrical power at all times.

In this regard, when used as shown in FIG. 3, the apparatus 100 can serve to provide electrical power to the drain loads 70 from the vehicle auxiliary battery 60 while conserving the charge level and electrical power capacity of the primary vehicle battery 10. As noted above, the apparatus 100 of FIG. 3 also serves an anti-theft function and/or a theft-deterrence function for the vehicle as the primary vehicle battery 10 is, and remains, completely disconnected from the vehicle ignition system 20 in the embodiment of FIG. 3 when the main cutoff switch is in the "switch open" state or position or in the "OFF" state or position.

The embodiment of FIG. 3 also illustrates an exemplary embodiment wherein the apparatus 100 can be utilized to provide security against a theft or an unauthorized use of the vehicle simply by the main cutoff switch 40 being maintained in the "switch open" or "OFF" state or position.

Figure 4:
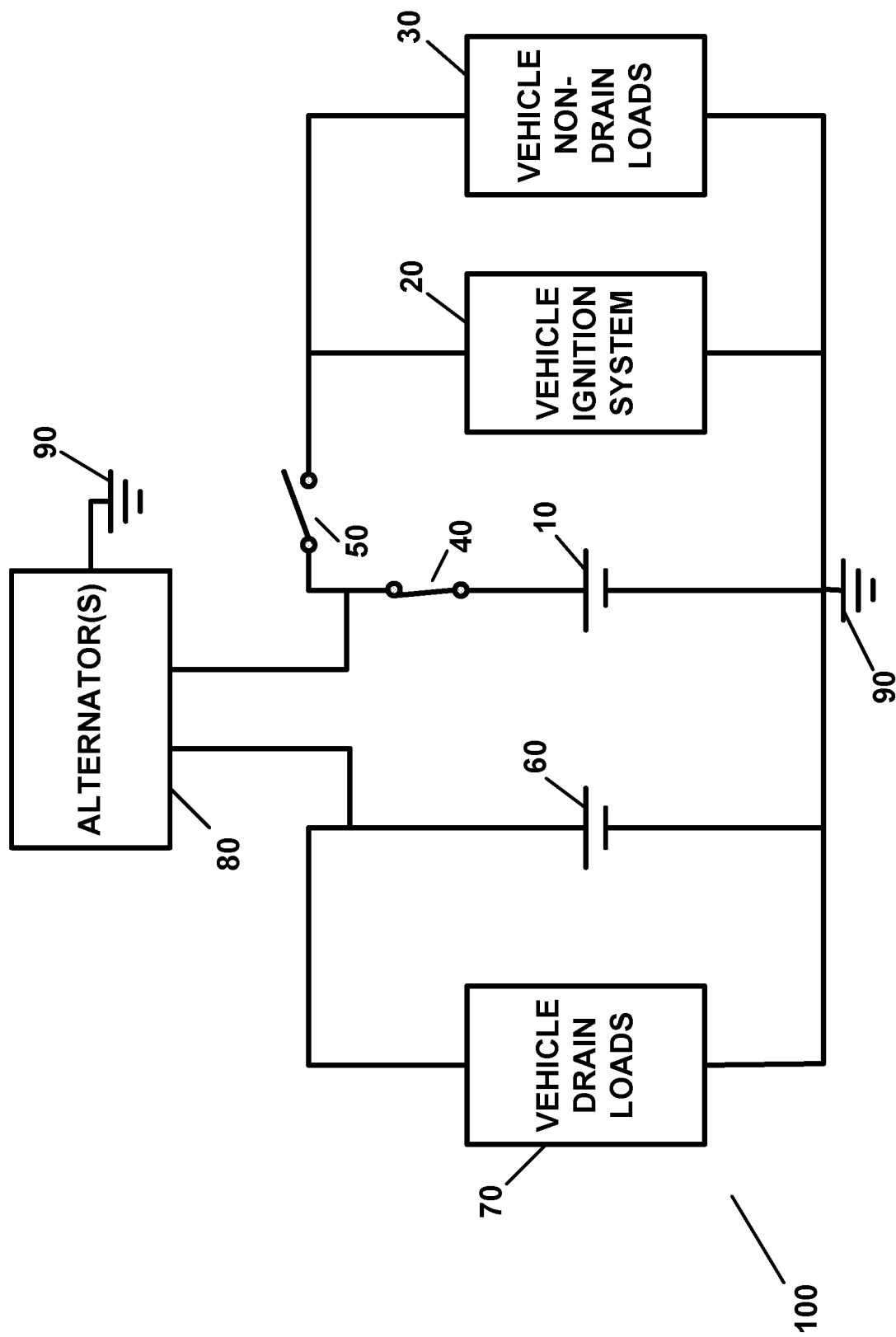
FIG. 4 illustrates the apparatus of FIG. 1 showing the main cutoff switch in the "switch closed" state or position or the "ON" state or position and showing the vehicle ignition/On switch in the "switch open" state or position or in the "OFF" state or position.

FIG. 4 illustrates the apparatus 100 of FIG. 1 showing the main cutoff switch 40 in the "switch closed" state or position or the "ON" state or position and showing the vehicle ignition/On switch 50 in the "switch open" state or position or in the "OFF" state or position. When the main cutoff switch 40 is in the "switch closed" state or position or the "ON" state or position, the primary vehicle battery 10 is capable of providing electrical power to the vehicle ignition system 20 and to any of the vehicle non-drain loads 30 described herein, and/or to any of the vehicle's systems, equipment systems, components, or devices, which can be powered by the primary vehicle battery 10, upon, and/or subject to, the closing of the vehicle ignition/On switch 50.

Figure 5:
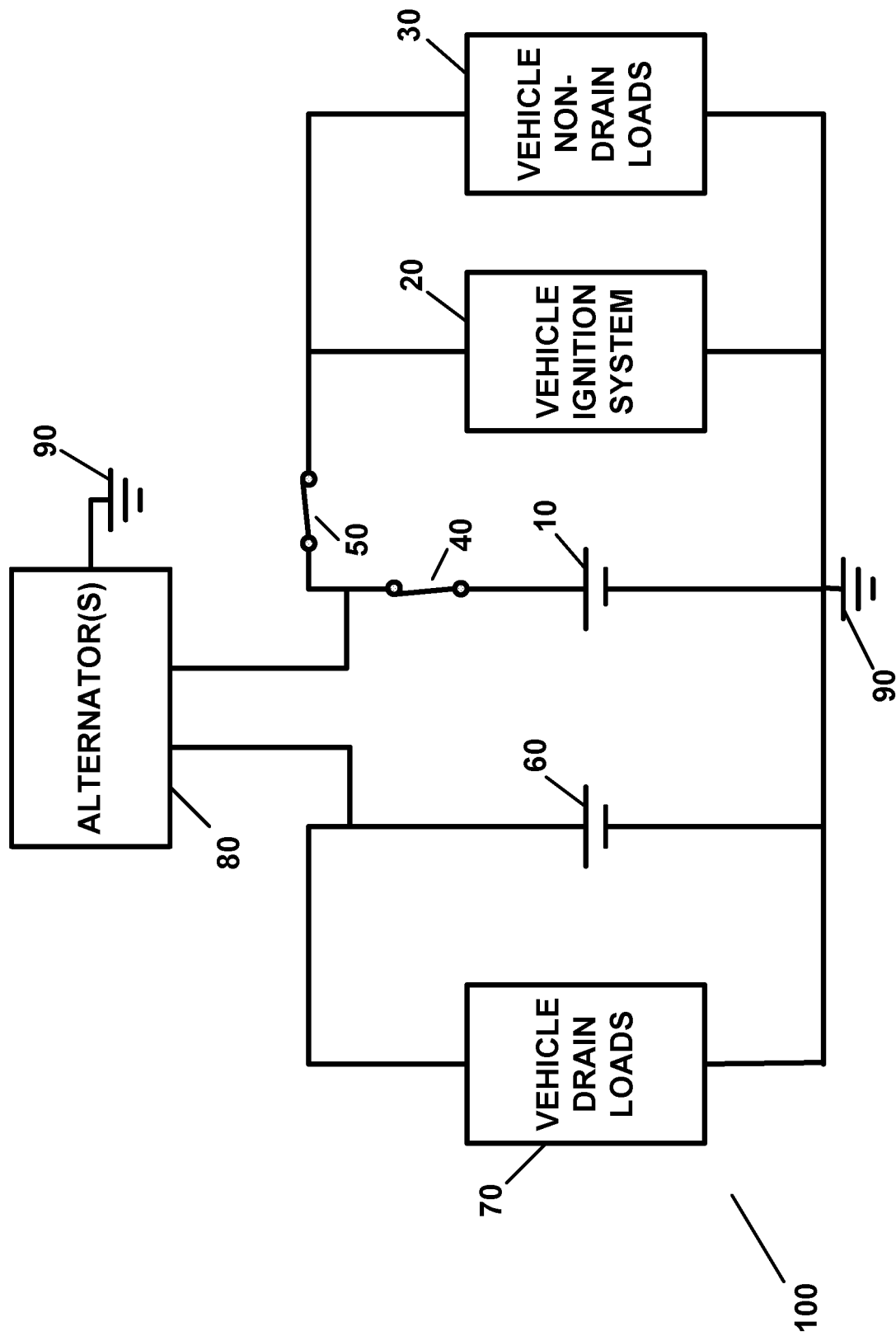
FIG. 5 illustrates the apparatus of FIG. 1 showing both the main cutoff switch and the vehicle ignition/On switch in the "switch closed" state or position or in the "ON" state or position.

FIG. 5 illustrates the apparatus 100 of FIG. 1 showing both the main cutoff switch 40 and the vehicle ignition/On switch 50 in the "switch closed" state or position or in the "ON" state or position. With reference to FIG. 5, with the main cutoff switch 40 being closed or in the "ON" position, an operator can start the vehicle's engine by closing the vehicle ignition/On switch 50. Once the vehicle engine is running, the primary vehicle battery 10 can provide electrical power to or for the vehicle ignition system 20 as well as to or for to any of the vehicle non-drain loads 30 described herein, and/or to any of the vehicle's systems, equipment systems, components, or devices.

During vehicle engine operation, the alternator 80 or alternators 80, if more than one alternator is utilized, and/or any respective component(s) of the alternator 80 or alternators 80, will be driven by the vehicle engine in order to generate electrical power which can include both an alternating current (AC) power and a direct current (DC) power. If a single alternator 80 is utilized, then the alternator 80 will re-charge both the primary vehicle battery 10 and the vehicle auxiliary battery 60 during vehicle engine operation and will also provide electrical power to or for any of the vehicle non-drain loads 30 or drain loads 70 described herein, and/or to any of the vehicle's systems, equipment systems, components, or devices. If two alternators are utilized, then one alternator 80 can be connected to, and can re-charge, the primary vehicle battery 10, and can provide AC and/or DC power to any of the vehicle non-drain loads 30 described herein, and/or to any of the vehicle's systems, equipment systems, components, or devices, while the other alternator 80 can be connected to, and can re-charge, the vehicle auxiliary battery 60, and can provide AC and/or DC power to any of the vehicle's drain loads 70. In this regard, both the primary vehicle battery 10 and the vehicle auxiliary battery 60 can be re-charged during vehicle engine operation.

In a preferred embodiment, the apparatus 100 provides the vehicle auxiliary battery 60 which can provide any and/or all of the vehicle drain loads 70 with electrical power when the vehicle engine is off or not running, while preserving and/or conserving the battery charge level of the primary vehicle battery 10 which can be completely disconnected from any electrical power or current drain loads, from the vehicle ignition system, and/or from any of the vehicle non-drain loads 30 described herein, and/or from any of the vehicle's system, equipment systems, components, or devices. The apparatus 100 provides a primary vehicle battery 10 which can be completely disconnected from any load, from the vehicle ignition system 20, from any of the vehicle non-drain loads 30 described herein, and/or to any of the vehicle's system, equipment systems, components, or devices, and/or from any of the vehicle drain loads 70, when the vehicle engine is not running, thereby maintaining a maximum charge level for the primary vehicle battery 10. Even if the charge level of the vehicle auxiliary battery 60 should become depleted during a period of non-use of the vehicle engine, the primary vehicle battery 10 can always have a sufficient charge level to start the vehicle engine and the respective vehicle alternator(s) 80 can re-charge the vehicle auxiliary battery 60 as well as can re-charge the primary vehicle battery 10.

Use of the apparatus 100 of the present invention can be optimized if the main cutoff switch 40 is opened, and, therefore, placed in the "switch open" state or position or in the "OFF" state or position, immediately after the vehicle engine is turned off and thereby returned to the "switch closed" state or position or the "ON" state or position just prior to attempting to start the vehicle engine or just prior to otherwise turning the vehicle, or any vehicle system, equipment system, component, or device, "ON", by closing the vehicle ignition/On switch 50, such as by switching the vehicle ignition/On switch 50 to the "switch closed" state or position or to the "ON" state or position, or by otherwise simply turning and ignition key or pushing an ignition button or switch. In this regard, the primary vehicle battery 10 can be "connected" when use of the vehicle, the vehicle engine, or any vehicle system, equipment system, component, or device powered by the primary vehicle battery, is desired, and the primary battery 10 can be "disconnected" when use of the vehicle, the vehicle engine, or any vehicle system, equipment system, component, or device, which is powered by the primary vehicle battery 10, has ceased and/or is no longer desired. Substantial anti-theft advantages are also realized by the apparatus 100 of the present invention as the vehicle engine will not be capable of being activated or started with the primary vehicle battery 10 being disconnected from the vehicle ignition system 20.

In the manner described herein, the apparatus 100 of the present invention provides a novel battery power management apparatus and method which can be utilized in order to provide an apparatus 100 or system which can be utilized to ensure that a charge level of a primary vehicle battery 10 can always be maintained, while allowing for sufficient electrical power to be provided to vehicle systems, equipment systems, components, or devices, which require and which continue to draw electrical power when the vehicle's engine is not running. In this regard, by using the apparatus 100 of the present invention, one can ensure that drain loads 70 or short circuits will not cause a primary vehicle battery 10 to discharge or to be depleted of its charge and/or "go dead" while also ensuring that any and/or all vehicle systems, equipment systems, components, or devices, which require electrical power at all times and/or when the vehicle engine is not running are provided with the electrical power needed to ensure their proper operation.

Figure 6:
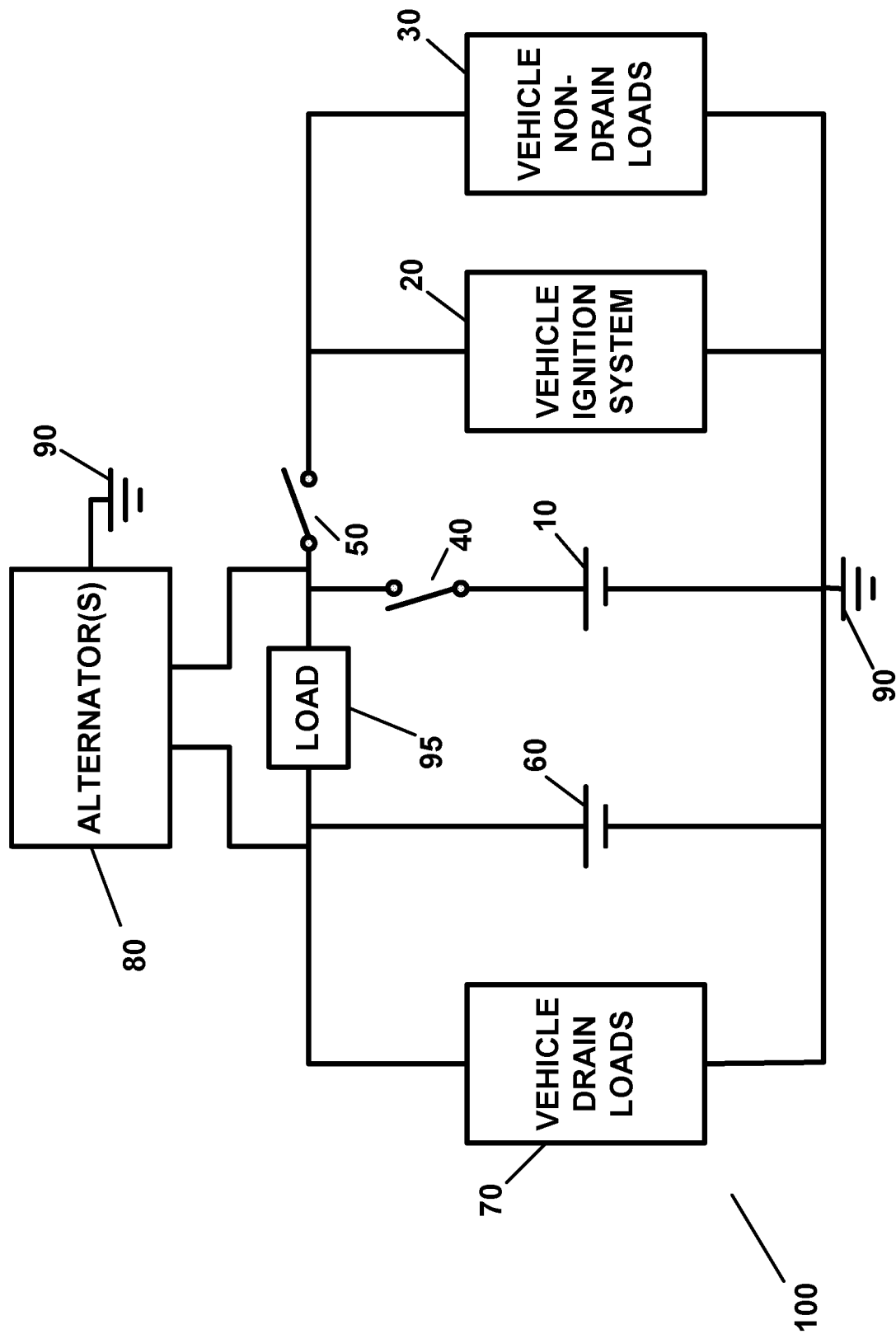
FIG. 6 illustrates another preferred embodiment of the apparatus of FIG. 1.

In another preferred embodiment, the vehicle auxiliary battery 60 can be utilized to provide electrical power to the circuit portion of the apparatus 100 which is connected to the primary vehicle battery 10 while the primary vehicle battery 10 can be utilized to provide electrical power to the circuit portion of the apparatus 100 which is connected to the vehicle auxiliary battery 60. FIG. 6 illustrates another preferred embodiment of the apparatus 100 of FIG. 1. In the embodiment of FIG. 6, the apparatus 100 can also include a voltage stabilizing load or resistor 95 (hereinafter "resistor 95" or "load 95") which can be utilized and which can be inserted between the circuit portion of the apparatus 100 which is powered by the primary vehicle battery 10 and the circuit portion of the apparatus 100 which is powered by the vehicle auxiliary battery 60 in order to connect the two circuit portions together. The resistor 95 can be connected in between the positive sides of each of the primary vehicle battery 10 and the vehicle auxiliary battery 60, as shown in FIG. 6.

With the use of the resistor 95, electrical power can be provided from the vehicle auxiliary battery 60 to the vehicle ignition system 20 and to the vehicle non-drain loads 30, if desired, when the vehicle ignition/On switch 50 is in the "switch closed" state or position or in the "ON" state or position, whether or not the main cutoff switch 40 is in the "switch closed" or "ON" state or position or in the "switch open" or "OFF" state or position. When the main cutoff switch 40 is in the "switch closed" state or position or in the "ON" state or position, electrical power can also be provided from the primary vehicle battery 10 to the vehicle drain loads 70, if desired. The resistor 95 serves to connect the two circuit portions together while providing a stabilizing voltage drop across same in the event that the respective voltages of the primary vehicle battery 10 and the vehicle auxiliary battery 60 are not equal.

In another preferred embodiment, the apparatus 100 and method of the present invention can also be utilized in order to provide power to any vehicle systems, equipment systems, devices, or components, in the event that the vehicle engine stops running, for any reason, which can result in the loss of the power being provided to any vehicle systems, vehicle equipment systems, devices, or components, which require power for the safe operation of the vehicle and/or for operator and/or occupant safety.

Figure 7:
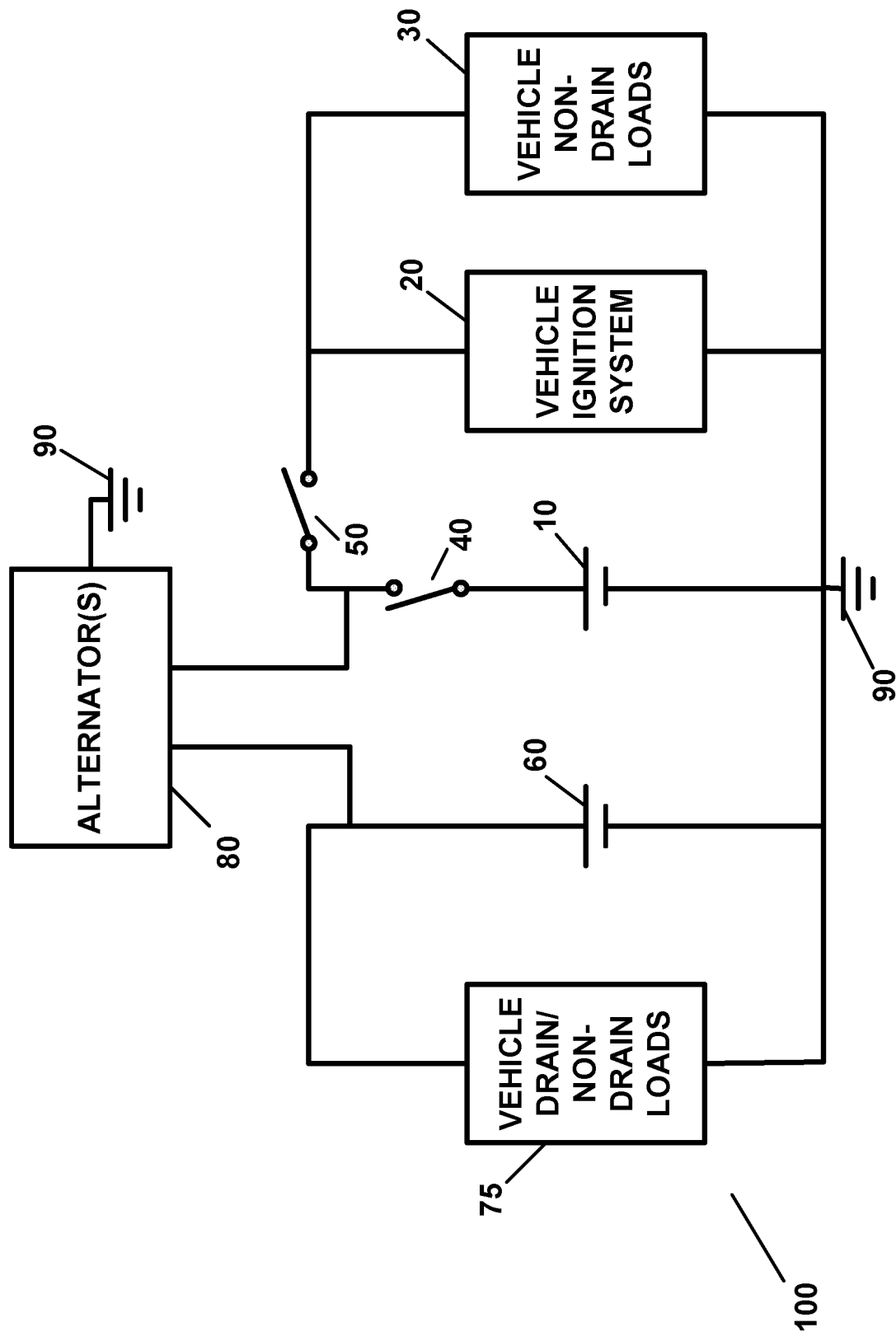
FIG. 7 illustrates still another preferred embodiment of the apparatus of FIG. 1.

FIG. 7 illustrates another preferred embodiment of the apparatus 100 of FIG. 1. In FIG. 7, the vehicle auxiliary battery 60 provides electrical power to the vehicle drain/non-drain loads 75. In a preferred embodiment, the vehicle drain/non-drain loads 75 include any and/or all of the vehicle drain loads 70 as well as any loads which can be, or which can include any of the vehicle systems, equipment systems, devices, or components, such as, but not limited to, the vehicle's power steering system, the vehicle's power brakes system, the vehicle's traction control system, the vehicle's electronic stability control system, the vehicle's anti-lock brake system, the vehicle's safety systems, the vehicle's lights, the vehicle's power door locks or vehicle power door lock systems, the vehicle's airbag systems, the vehicle's passenger restraint systems, the vehicle's supplemental restraint systems, the vehicle's communication systems, and/or the vehicle's emergency communication systems, and/or any other load, or vehicle system, equipment system, device, or component. In a preferred embodiment, any of the vehicle drain/non-drain loads 75 can be designed to operate on DC power in the event that the vehicle engine stops running, for any reason.

With reference to FIG. 7, the apparatus 100 is designed so that the vehicle auxiliary battery 60 can provide electrical power to any and/or all of the vehicle drain/non-drain loads 75 which are connected to same in the event the vehicle engine stops running for any reason. In this regard, the vehicle auxiliary battery 60 can provide power to any of the loads, vehicle systems, equipment systems, devices, or components, in the event that the vehicle engine stops running for any reason.

In another preferred embodiment, the primary vehicle battery 10 can be utilized in order to provide electrical power to the vehicle ignition system 20 and to any number of, or any of, the vehicle non-drain loads 30. In yet another preferred embodiment, the primary vehicle battery 10 can also be utilized so as to provide electrical power only to the vehicle ignition system 20.

Figure 8:
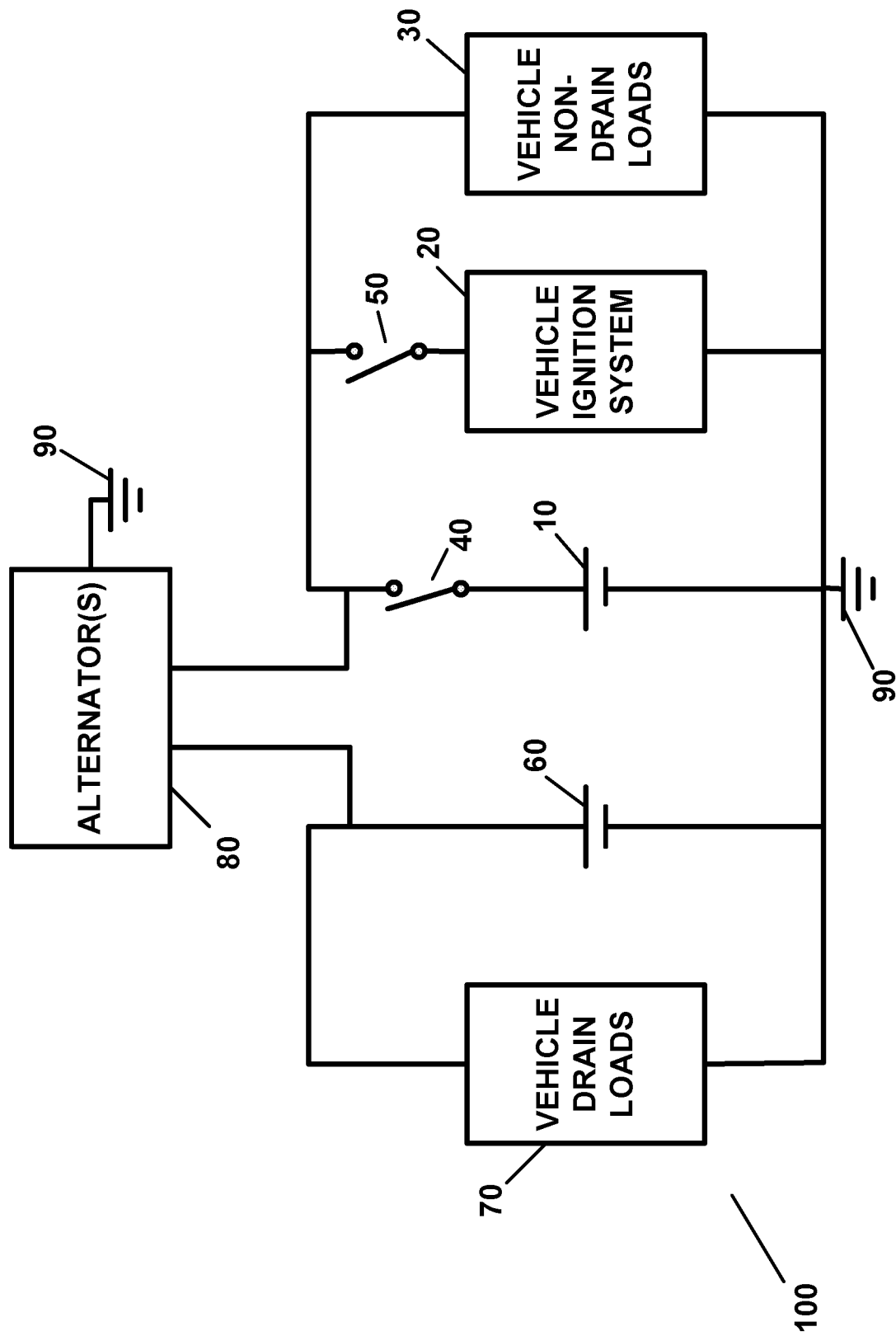
FIG. 8 illustrates yet another preferred embodiment of the apparatus of FIG. 1.

In another preferred embodiment, the apparatus 100 can also be utilized in such a way so that the primary vehicle battery 10 can provide power to the vehicle non-drain loads 30 without providing power to the vehicle ignition system 20. FIG. 8 illustrates another preferred embodiment of the apparatus 100 of FIG. 1. With reference to FIG. 8, the vehicle ignition/On switch 50 is situated at the location shown. In this manner, with the vehicle ignition/On switch 50 in the "switch open" state or position or in the "OFF" state or position, and with the main cutoff switch in the "switch closed" state or position or in the "ON" state or position, the primary vehicle battery 10 can provide power to the vehicle non-drain loads 30 without providing power to the vehicle ignition system 20.

The apparatus 100 of the present invention can be utilized in a same, a similar, and/or an analogous, manner, as described herein, in and/or with any application involving any type or kind or vehicles, premises, or articles, which utilize rechargeable batteries to provide electrical power to any type or kind of system, equipment system, component, or device, of the respective vehicle, premises, or article, while also providing electrical power to systems, equipment systems, components, or devices, of the respective vehicle, premises, or article, which require electrical power at all times.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. An apparatus, comprising:
   a first circuit, wherein the first circuit contains a first load of a premises, wherein the first load does not draw current from a first battery when a system of the premises is not operating;
   a second circuit, wherein the second circuit contains a second load of the premises, wherein the second load draws current from a second battery when the system is not operating or is non-operational;
   a first switch, wherein the first switch is capable of disconnecting the first battery from the first circuit;
   a second switch, wherein the second switch is capable of connecting the first battery to the first circuit; and
   at least one recharger, wherein the at least one recharger is capable of recharging the first battery and the second battery when the system is operating, wherein the apparatus is capable of providing electrical power to the second load when the at least one recharger ceases to operate or becomes non-operational.

2. The apparatus of claim 1, further comprising:
the first battery.

3. The apparatus of claim 1, further comprising:
the second battery.

4. The apparatus of claim 1, further comprising:
   a receiver, wherein the receiver receives a signal transmitted from a remote control device or a wireless device, wherein the apparatus opens the first switch in response to the signal, or wherein the apparatus closes the first switch in response to the signal.

5. The apparatus of claim 1, further comprising:
   a receiver, wherein the receiver receives a signal transmitted from a central processing computer, wherein the signal is transmitted over the Internet or the World Wide Web to the receiver, and further wherein the apparatus opens the first switch in response to the signal, or wherein the apparatus closes the first switch in response to the signal.

6. The apparatus of claim 1, further comprising:
   a third load, wherein the third load is connected between the first circuit and a third circuit, wherein the third circuit contains the second battery, and further wherein the third load generates a circuit stabilizing voltage drop when respective voltage levels of the first battery and the second battery are not equal.

7. The apparatus of claim 1, wherein the first switch is a cut-off switch.

8. The apparatus of claim 1, wherein the second switch is a switch associated with the system.

9. An apparatus, comprising:
   a first battery, wherein the first battery is capable of providing electrical power to a first load of a premises, wherein the first load does not draw current when a system of the premises is not operating;
   a second battery, wherein the second battery is capable of providing electrical power to a second load of the premises, wherein the second load draws current when the system is not operating or is non-operational;
   a first switch, wherein the first switch is capable of disconnecting the first battery from a first circuit containing the system;
   a second switch, wherein the second switch is capable of connecting the first battery to the first circuit containing the system and is capable of connecting the first battery to a second circuit containing the first load; and
   at least one recharger, wherein the at least one recharger recharges both the first battery and the second battery when the system is operating,
   wherein the second battery provides electrical power to the second load when the at least one recharger ceases to operate or becomes non-operational.

10. The apparatus of claim 9, further comprising:
    a receiver, wherein the receiver receives a signal transmitted from a central processing computer, wherein the signal is transmitted over the Internet or the World Wide Web to the receiver, and further wherein the apparatus closes the first switch in response to the signal or opens the first switch in response to the signal.

11. An apparatus, comprising:
a first circuit, wherein the first circuit contains a first load of a premises or article, wherein the first load does not draw current from a first battery when a system of the premises or article is not operating;
a second circuit, wherein the second circuit contains a second load of the premises or article, wherein the second load draws current from a second battery when the system is not operating or is non-operational;
a first switch, wherein the first switch is capable of disconnecting the first battery from the first circuit;
a second switch, wherein the second switch is capable of connecting the first battery to the first circuit; and
at least one recharger, wherein the at least one recharger is capable of recharging the first battery and the second battery when the system is operating, wherein the apparatus is capable of providing electrical power to the second load when the at least one recharger ceases to operate or becomes non-operational.

12. The apparatus of claim 11, further comprising:
the first battery.

13. The apparatus of claim 11, further comprising:
the second battery.

14. The apparatus of claim 11, further comprising:
a receiver, wherein the receiver receives a signal transmitted from a remote control device or a wireless device, wherein the apparatus opens the first switch in response to the signal, or wherein the apparatus closes the first switch in response to the signal.

15. The apparatus of claim 11, further comprising:
a receiver, wherein the receiver receives a signal transmitted from a central processing computer, wherein the signal is transmitted over the Internet or the World Wide Web to the receiver, and further wherein the apparatus opens the first switch in response to the signal, or wherein the apparatus closes the first switch in response to the signal.

16. The apparatus of claim 11, further comprising:
a third load, wherein the third load is connected between the first circuit and a third circuit, wherein the third circuit contains the second battery, and further wherein the third load generates a circuit stabilizing voltage drop when respective voltage levels of the first battery and the second battery are not equal.

17. The apparatus of claim 11, wherein the first switch is a cut-off switch.

18. The apparatus of claim 11, wherein the second switch is a switch associated with the system.

19. The apparatus of claim 11, wherein the first load is a first load of a premises.

20. The apparatus of claim 11, wherein the first load is a first load of an article.

* * * * *